US011512462B2

(12) United States Patent
Yahav (10) Patent No.: US 11,512,462 B2
(45) Date of Patent: Nov. 29, 2022

(54) BAMBOO CONNECTOR SYSTEM

(71) Applicant: Udi Yahav, Rehovot (IL)

(72) Inventor: Udi Yahav, Rehovot (IL)

( * ) Notice: Subject to any disclaimer, the term of this patent is extended or adjusted under 35 U.S.C. 154(b) by 1104 days.

(21) Appl. No.: 15/927,136

(22) Filed: Mar. 21, 2018

(65) Prior Publication Data

US 2019/0292769 A1  Sep. 26, 2019

(51) Int. Cl.
| | |
|---|---|
| *E04B 1/26* | (2006.01) |
| *E04B 1/58* | (2006.01) |
| *E04G 1/10* | (2006.01) |
| *F16B 11/00* | (2006.01) |
| *E04G 1/06* | (2006.01) |
| *B29C 65/48* | (2006.01) |
| *E04B 1/19* | (2006.01) |

(52) U.S. Cl.
CPC ............ *E04B 1/2604* (2013.01); *B29C 65/48* (2013.01); *E04B 1/5837* (2013.01); *E04B 1/5843* (2013.01); *E04G 1/06* (2013.01); *E04G 1/10* (2013.01); *F16B 11/008* (2013.01); *E04B 2001/193* (2013.01); *E04B 2001/1945* (2013.01); *E04B 2001/1957* (2013.01); *E04B 2001/2668* (2013.01); *E04B 2001/2676* (2013.01)

(58) Field of Classification Search
CPC ......... B29C 65/48; B29C 65/54; E04B 1/486; E04B 1/2604; E04B 1/585; F16B 13/141; F16B 39/021
USPC ......................................................... 264/129
See application file for complete search history.

(56) References Cited

U.S. PATENT DOCUMENTS

| | | | | |
|---|---|---|---|---|
| 4,776,738 | A | * | 10/1988 | Winston .................. F16B 3/005 411/101 |
| 5,466,086 | A | * | 11/1995 | Goto ..................... E04B 1/2604 403/267 |
| 6,957,479 | B2 | | 10/2005 | Londono et al. |
| 9,429,184 | B2 | | 8/2016 | Pelton |
| 10,400,813 | B2 | * | 9/2019 | Cloud ................... F16B 11/006 |
| 2004/0109738 | A1 | * | 6/2004 | Ducker, III ........... F16B 35/041 411/82.1 |
| 2005/0271481 | A1 | | 12/2005 | Zins |
| 2006/0053729 | A1 | * | 3/2006 | Wallner .................... B27C 3/06 52/655.1 |
| 2008/0098690 | A1 | | 5/2008 | Wang |
| 2011/0250022 | A1 | * | 10/2011 | Robertson, Jr. ........ F16B 13/066 405/259.4 |
| 2014/0308067 | A1 | | 10/2014 | Boudeman |
| 2017/0241127 | A1 | | 8/2017 | Ross |

FOREIGN PATENT DOCUMENTS

| | | |
|---|---|---|
| CN | 203238781 | 10/2013 |
| DE | 102011013783 | 9/2012 |
| JP | 2002-088929 | 3/2002 |

OTHER PUBLICATIONS

PCT Search Report PCT/IB2019/052149, dated Oct. 2, 2019.
PCT IPRP PCT/IB2019/052149, dated Jul. 9, 2020.

* cited by examiner

*Primary Examiner* — Matthew J Daniels
*Assistant Examiner* — Hana C Page
(74) *Attorney, Agent, or Firm* — David Klein (57) ABSTRACT

A method includes forming a cutout in a bamboo pole, the cutout having a non-uniform perimeter, and in which the perimeter increases towards a region of the bamboo pole where fibers of the pole are stronger than other regions of the bamboo pole.

5 Claims, 12 Drawing Sheets

BAMBOO CONNECTOR SYSTEM

FIELD OF THE INVENTION

The present invention relates generally to connector systems for connecting bamboo poles (culms) and bamboo segments.

BACKGROUND OF THE INVENTION

Bamboo poles or segments have been long used as building materials. Bamboo framing and scaffolding is used frequently in construction. Bamboo has excellent strength and strength-to-weight ratio. Bamboo is used to build scaffolding in Hong Kong and is used to build many other structures in Japan, China, Indonesia and other East Asian countries. A variety of bamboo found in several parts of Colombia, Ecuador, and Venezuela, called *guadua angustifolia*, has been to make structures and this variety has excellent physical and mechanical properties.

However, current methods of connecting bamboo members to each other and to other surfaces or devices result in structures of inferior quality. In addition to simply fastening the poles together with rope or twine wrappings, the segments have also been connected by bolts or wire. These prior art connections do not resist bending moments at the joints and may cause weaknesses in the bamboo itself because of using perforations. Additionally, these prior art connections are not useful over the long life of a building.

SUMMARY OF THE INVENTION

The present invention seeks to provide connector systems for connecting bamboo poles (or culms) and bamboo segments (such as split poles or bamboo boards), as is described more in detail hereinbelow. The connector systems provide long-lasting connections that comply with building codes and standards of all advanced countries in the world and enable using bamboo as a competitive construction material in almost any structure. The connector systems may be systematically manufactured according to any engineering need so that users can order connectors or bamboo poles with the connectors attached thereto from a catalog like any other engineering material.

There is provided in accordance with an embodiment of the invention a method including bonding a connector to a bamboo pole, the connector formed with an internal passageway that opens to an outer surface of the connector, by placing the connector on a portion of the bamboo pole and causing an adhesive to flow into the internal passageway and flow to the outer surface of the connector such that the adhesive also contacts the portion of the bamboo pole and bonds the connector to the bamboo pole.

In accordance with an embodiment of the invention the portion of the bamboo pole is on an inner perimeter of the bamboo pole.

In accordance with an embodiment of the invention the portion of the bamboo pole is on an outer perimeter of the bamboo pole.

In accordance with an embodiment of the invention the portion of the bamboo pole is at an end of the bamboo pole.

In accordance with an embodiment of the invention the portion of the bamboo pole is between opposite ends of the bamboo pole.

In accordance with an embodiment of the invention the connector includes a body formed with a transverse aperture which communicates with a longitudinal opening.

In accordance with an embodiment of the invention the connector includes a body formed with an off-center opening.

In accordance with an embodiment of the invention the connector includes a conical body formed with a central longitudinal opening and additional longitudinal openings formed offset to the central longitudinal opening.

In accordance with an embodiment of the invention the connector includes a body formed with a central longitudinal opening that opens into at least one transverse passageway which widens into a diverging opening that widens towards a side of the body.

In accordance with an embodiment of the invention the connector is constructed of parts that fit together by means of mating portions.

In accordance with an embodiment of the invention a seal is provided for sealing flow of the adhesive.

In accordance with an embodiment of the invention the connector includes a body formed with an opening, the body being conical at one portion and cylindrical at another portion.

In accordance with an embodiment of the invention the connector includes a body with a concave or convex surface.

There is provided in accordance with an embodiment of the invention a method including forming a cutout in a bamboo pole, the cutout having a non-uniform perimeter, wherein the perimeter increases towards a region of the bamboo pole where fibers of the pole are stronger or denser than other regions of the bamboo pole.

In accordance with an embodiment of the invention the region of the bamboo pole where fibers of the pole are stronger or denser is a region that is closer to an outside diameter of the bamboo pole than other regions of the bamboo pole.

In accordance with an embodiment of the invention the cutout has an end portion at an end of the bamboo pole which is conical with straight sides.

In accordance with an embodiment of the invention the cutout has an end portion at an end of the bamboo pole which is conical with curved sides.

In accordance with an embodiment of the invention the cutout has a cylindrical portion that extends axially inwards into the bamboo pole from the end portion.

In accordance with an embodiment of the invention the cutout has a cylindrical portion that extends axially inwards into the bamboo pole from the end portion.

In accordance with an embodiment of the invention the method includes bonding an end connector into the cutout with an adhesive.

There is provided in accordance with an embodiment of the invention a method including forming apertures in a wall thickness of a bamboo pole, the apertures extending along a longitudinal length from one end of the bamboo pole towards an opposite end of the bamboo pole, and securing a connector which has protrusions to the bamboo pole such that the protrusions are received in the apertures.

In accordance with an embodiment of the invention the protrusions are posts.

In accordance with an embodiment of the invention the protrusions are posts, each of the posts having a skirt which serves as a washer or base after insertion into the bamboo pole.

In accordance with an embodiment of the invention the protrusions are posts that have a threaded portion.

In accordance with an embodiment of the invention the method includes coupling an interface element to the protrusions.

There is provided in accordance with an embodiment of the invention a method including a connector including a plurality of mounting elements and bamboo poles connected to the mounting elements.

BRIEF DESCRIPTION OF THE DRAWINGS

The present invention will be understood and appreciated more fully from the following detailed description taken in conjunction with the drawings in which:

FIGS. 22A-23E are simplified perspective illustrations of connectors for connecting to a side surface of a bamboo pole, in accordance with non-limiting embodiments of the present invention;

DETAILED DESCRIPTION OF EMBODIMENTS

In general, for all connector systems of the invention, the parts may be made of metal (such as but not limited to, aluminum or steel alloys, titanium alloys, brass, bronze, and many others), plastic (such as but not limited to, nylon, polycarbonate, acetal homopolymer resin and many others), wood (such as but not limited to, soft wood, hard wood, plywood, OSB and many others), and other engineering materials.

Figures 1A, 1B:
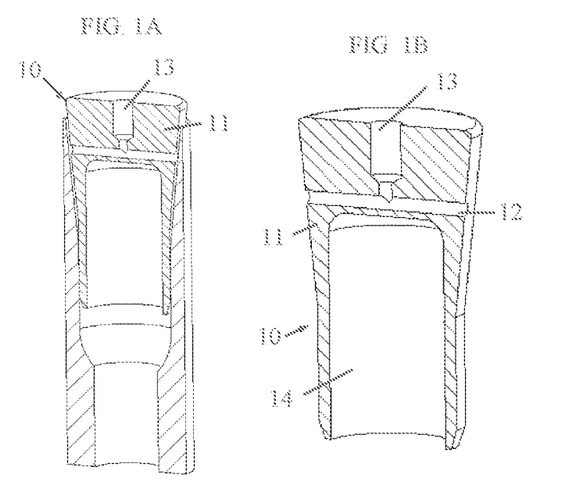
FIG. 1A is a simplified sectional illustration of a conical connector for a bamboo pole, inserted in the pole, in accordance with a non-limiting embodiment of the present invention, with a transverse adhesive passageway.
FIG. 1B is a simplified sectional illustration of the connector of FIG. 1A.
Figure 1C:
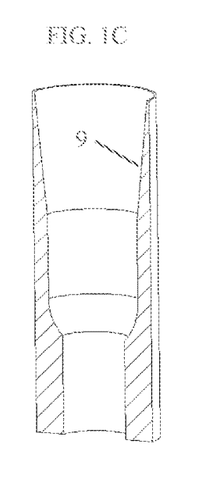
FIG. 1C is a simplified sectional illustration of the bamboo pole that has been prepared for the connector of FIG. 1A, in accordance with a non-limiting embodiment of the present invention.

Reference is now made to FIGS. 1A-1C, which illustrate an end connector 10 for a bamboo pole, in accordance with a non-limiting embodiment of the present invention.

The connector 10 includes a conical body 11 formed with a transverse aperture 12 which communicates with a longitudinal opening 13. The tapered end of conical body 11 may be formed with a counterbore 14 to reduce weight. After inserting end connector 10 into an open end of a bamboo pole (whether the bamboo pole was specially prepared or not; this is true for all embodiments), adhesive may be introduced into longitudinal opening 13 and the adhesive flows to transverse aperture 12, from there flowing into, and uniformly coating, the gap between the outer contour of conical body 11 and the inner contour 9 of the bamboo pole, thereby achieving an excellent fixation of end connector 10 into the bamboo pole. It is noted that bamboo poles do not have a standard inside diameter; there is a wide range even for the same outside diameter, as happens with plants that grow naturally. The conical shape solves this problem by snugly fitting into a wide range of inside diameters.

Figure 1D:
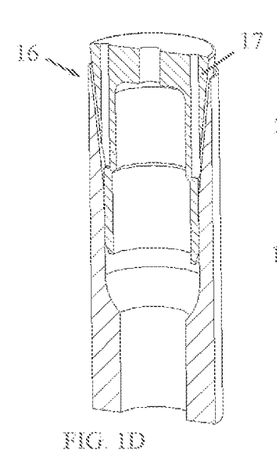
FIG. 1D is a simplified sectional illustration of a conical connector for a bamboo pole, inserted in the pole, in accordance with a non-limiting embodiment of the present invention, with one or more parallel adhesive passageways.
Figure 1E:
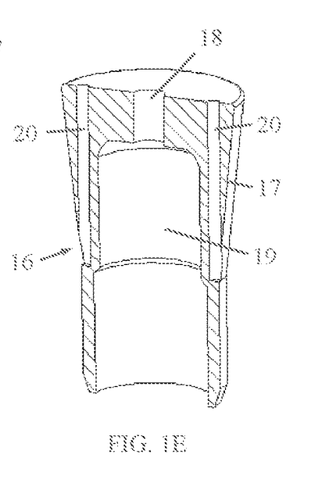
FIG. 1E is a simplified sectional illustration of the connector of FIG. 1D.
Figure 1F:
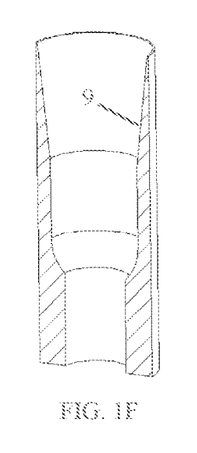
FIG. 1F is a simplified sectional illustration of the bamboo pole that has been prepared for the connector of FIG. 1D, in accordance with a non-limiting embodiment of the present invention.

Reference is now made to FIGS. 1D-1F, which illustrate another connector 16 for a bamboo pole, in accordance with another non-limiting embodiment of the present invention.

The connector 16 includes a conical body 17 formed with a central longitudinal opening 18 that opens into a counterbore 19 (used, for example, to reduce weight). Additional longitudinal openings 20 (two or more) may be formed offset to central longitudinal opening 18, preferably, but not necessarily, symmetric with central longitudinal opening 18. After inserting end connector 16 into an open end of a bamboo pole, adhesive may be introduced into longitudinal openings 20 and the adhesive flows to, and uniformly coats, the gap between the outer contour of conical body 17 and the inner contour of the bamboo pole, thereby achieving an excellent fixation of end connector 16 into the bamboo pole 9.

Figure 2A:
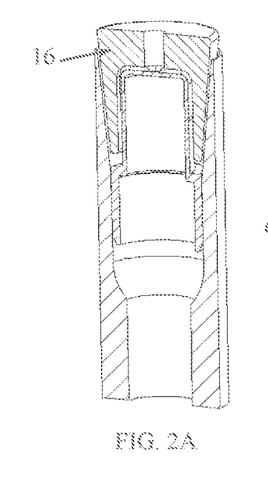
FIG. 2A is a simplified sectional illustration of a conical connector for a bamboo pole, inserted in the pole, in accordance with a non-limiting embodiment of the present invention, conical with mating parts.
Figure 2B:
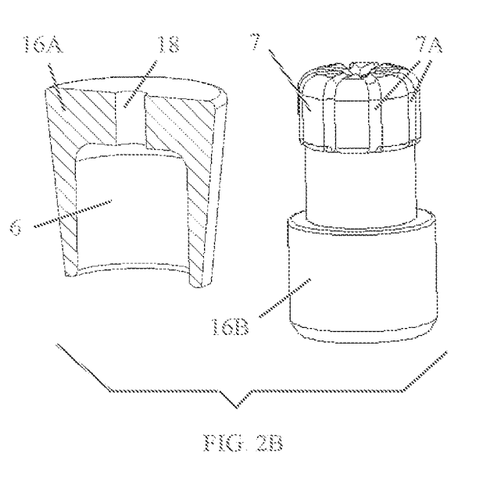
FIG. 2B is a simplified sectional illustration of the mating parts connector of FIG. 2A.
Figure 2C:
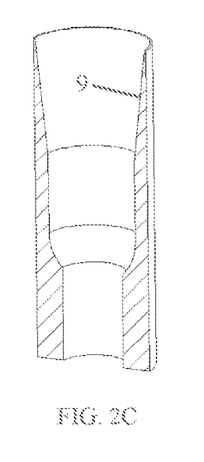
FIG. 2C is a simplified sectional illustration of the bamboo pole that has been prepared for the connector of FIG. 2A, in accordance with a non-limiting embodiment of the present invention.

In FIGS. 2A-2C, connector 16 is made of two or more parts, such as a first part 16A and a second part 16B. First part 16A may be formed with a recess 6 into which a shaft 7 of second part 16B may be press fit.

In this embodiment, the adhesive may flow through the longitudinal opening 18 of the first part 16A, then flow over grooves 7A formed in shaft 7 (downwards in the sense of FIGS. 2A-2C) and then flow back (upwards in the sense of FIGS. 2A-2C) over the outer contour of first part 16A in the gap between first part 16A and the inner contour 9 of the bamboo pole. This applies for other embodiments that have two parts (both internal and external connectors).

The connectors 10 and 16, as well as any of the other connectors described herein, may be rotated along their longitudinal axis after insertion into the bamboo pole, to help smear the adhesive around the perimeter of the connector. The longitudinal opening (e.g., 13 or 18) for any of the other connectors described herein may be used as a mounting aperture when connecting poles to each other as described below.

Figure 3A:
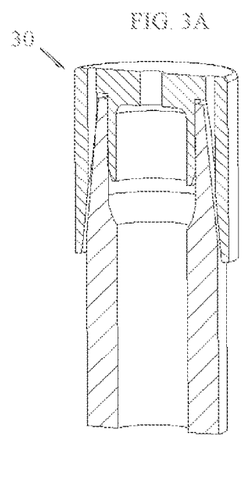
FIG. 3A is a simplified sectional illustration of an external connector for a bamboo pole, inserted in the pole, in accordance with a non-limiting embodiment of the present invention.
Figure 3B:
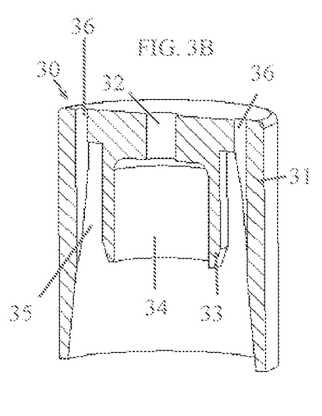
FIG. 3B is a simplified sectional illustration of the connector of FIG. 3A.
Figure 3C:
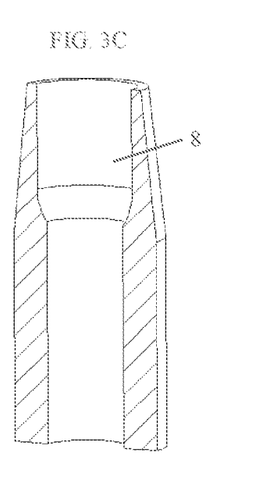
FIG. 3C is a simplified sectional illustration of the bamboo pole that has been prepared for the connector of FIG. 3A, in accordance with a non-limiting embodiment of the present invention.

Reference is now made to FIGS. 3A-3C, which illustrate an external connector 30 for a bamboo pole, inserted in the pole, in accordance with a non-limiting embodiment of the present invention.

Connector 30 has a partially conical, partially cylindrical body 31 formed with a central longitudinal opening 32 formed in an inner shaft 33 (opening may extend into a counterbore 34). Body 31 is partially conical because it is conical on the inside (to match the bamboo pole which has been formed with an outer conical shape) and it is partially cylindrical because it has a cylindrical portion on the inside (the bamboo pole has been formed with an inner cylindrical shape). The cylindrical part helps center connector 30 within the bamboo pole, and as a result, there is a uniform gap between the conical part and the outside of the bamboo pole and the connector is properly held in place during setting of the adhesive. Inner shaft 33 is spaced from the conical body 31 by an annular gap 35. Additional longitudinal openings 36 (two or more), for intruding therein adhesive, may be formed offset to central longitudinal opening 32, preferably, but not necessarily, symmetric with central longitudinal opening 32. The upper end of body 31 is thus formed with a circumferential skirt that fits over the end of the bamboo pole. Before bonding end connector 30 to the bamboo pole, the connector 30 may initially be inserted into the inner contour 8 of the pole. The connector 30 becomes centered in the pole; the pole fits into gap 35. Adhesive is then inserted via openings 36 and the adhesive flows in the remaining gap between the bamboo pole and the connector 30.

Figure 4A:
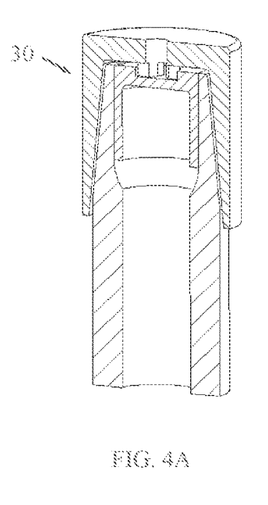
FIG. 4A is a simplified sectional illustration of an external connector for a bamboo pole, inserted in the pole, in accordance with a non-limiting embodiment of the present invention, conical with mating parts.
Figure 4B:
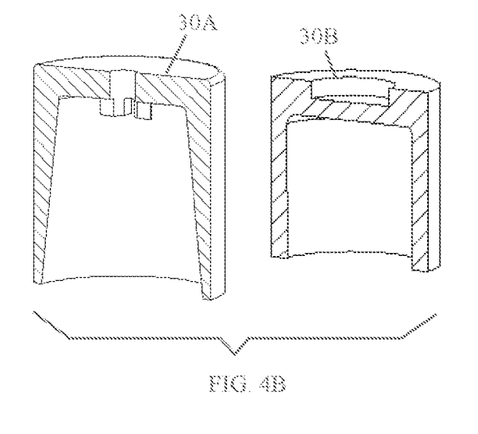
FIG. 4B is a simplified sectional illustration of the mating parts connector of FIG. 4A.
Figure 4C:
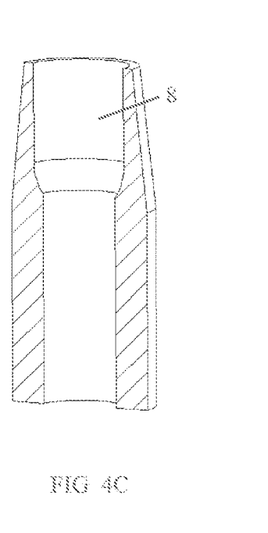
FIG. 4C is a simplified sectional illustration of the bamboo pole that has been prepared for the connector of FIG. 4A, in accordance with a non-limiting embodiment of the present invention.

Reference is now made to FIGS. 4A-4C, which illustrate another version of connector 30 made of mating parts 30A and 30B, which mate with male and female connections.

Reference is now made to FIGS. 5A-5D, which illustrate a connector 50, in accordance with another non-limiting embodiment of the present invention.

Figure 5A:
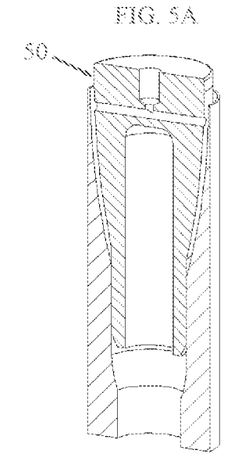
FIG. 5A is a simplified sectional illustration of a curved conical connector for a bamboo pole, inserted in a curved cutout that increases the contact area between the connector and the inside of the bamboo pole towards the outer diameter of the pole where the bamboo fibers have greater density and strength, in accordance with a non-limiting embodiment of the present invention.
Figure 5B:
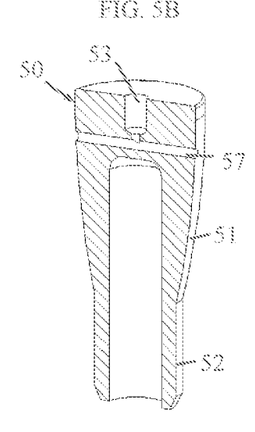
FIG. 5B is a simplified sectional illustration of the connector of FIG. 5A.
Figure 5C:
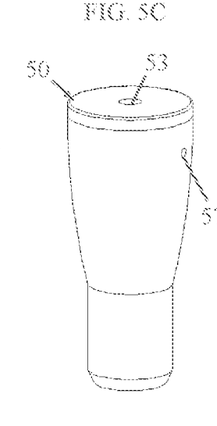
FIG. 5C is a simplified perspective illustration of the connector of FIG. 5A.

Connector 50 has a conical portion 51 at its upper portion that extends into a straight portion 52 at its bottom. The conical portion 51 is formed with a central longitudinal opening 53 (with or without a uniform diameter) which fluidly communicates with a transverse opening 57, as described above. Adhesive may be applied onto the outer surface of connector 50 before inserting into an open end of a bamboo pole 54 (or may be applied into the opening before or after inserting the connector, or both).

Figure 5D:
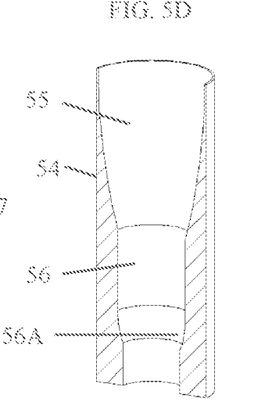
FIG. 5D is a simplified sectional illustration of the bamboo pole that has been prepared for the connector of FIG. 5A, in accordance with a non-limiting embodiment of the present invention.

As seen in FIG. 5D, bamboo pole 54 has been prepared for connector 50 with a curved conical cutout 55 that extends into a straight (cylindrical) cutout 56. The curved conical cutout 55 increases the contact area between the connector 50 and the inside of the bamboo pole 54 towards the outer diameter of the pole 54, where the bamboo fibers have greater density and strength. The straight portion 52 fits into the cylindrical cutout 56 and increases the resistance of the connector 50 to being pulled out of the pole 54 by a torque applied to the connector 50. Thus, the invention uniquely takes advantage of the greater strength of the bamboo pole both in terms of adhesion to greater density of fibers and in terms of pull-out strength. The cylindrical part 56 helps center connector 50 within the bamboo pole, and as a result, there is a uniform gap between the conical part and the bamboo pole and the connector is properly held in place during setting of the adhesive (this is applicable for other embodiments of the invention).

Another feature is the bottom edge of cylindrical cutout 56 is rounded with a curved inner rim 56A, which prevents stress concentration in the bamboo pole.

The combination of curved conical cutout that extends into a cylindrical cutout with a curved inner rim may be used in other embodiments of the invention.

Figure 5E:
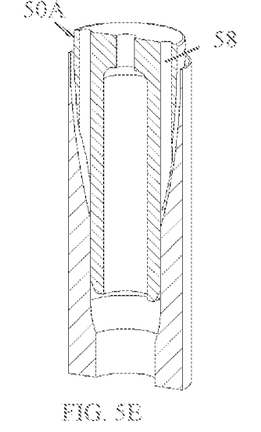
FIG. 5E is a simplified sectional illustration of a curved conical connector for a bamboo pole, having additional longitudinal openings, in accordance with a non-limiting embodiment of the present invention.
Figure 5F:
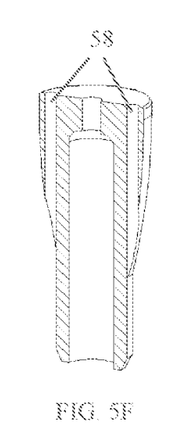
FIGS. 5F and 5G are simplified sectional and perspective illustrations, respectively, of the connector of FIG. 5E.
Figure 5G:
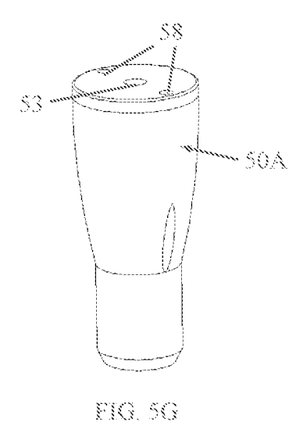

Reference is now made to FIGS. 5E-5G, which illustrate another connector 50A for a bamboo pole, in accordance with another non-limiting embodiment of the present invention.

Connector 50A is similar to connector 50 except that connector 50A has additional longitudinal openings 58 (two or more) may be formed offset to central longitudinal opening 53, as described above.

Figure 5H:
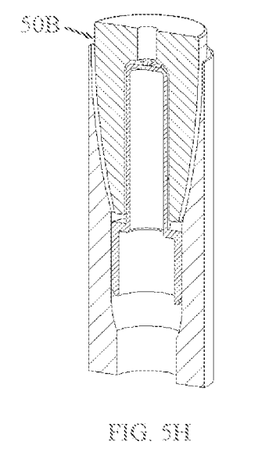
FIG. 5H is a simplified sectional illustration of a conical connector for a bamboo pole, inserted in the pole, in accordance with a non-limiting embodiment of the present invention, conical with mating parts.
Figure 5I:
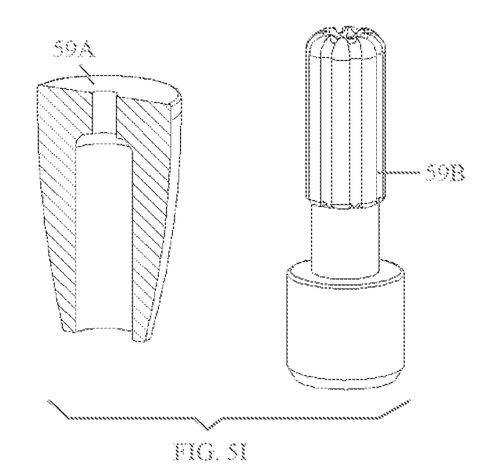
FIG. 5I is a simplified sectional illustration of the mating parts connector of FIG. 5H.

Reference is now made to FIGS. 5H-5I, which illustrate another connector 50B for a bamboo pole, in accordance with another non-limiting embodiment of the present invention.

Connector 50B is similar to connector 50A except that connector 50B is made of two or more parts, such as a first part 59A and a second part 59B that are fitted together, as described above.

Figure 6A:
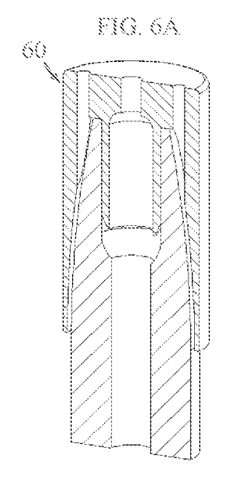
FIG. 6A is a simplified sectional illustration of an external connector for a bamboo pole, mounted on a curved surface formed on the pole, in accordance with a non-limiting embodiment of the present invention.
Figure 6B:
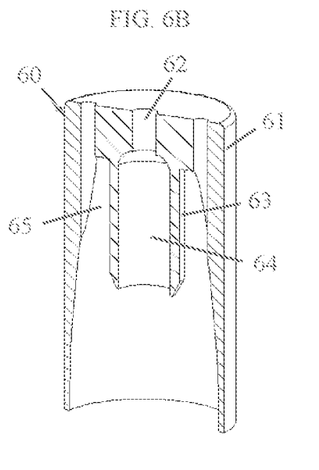
FIG. 6B is a simplified sectional illustration of the connector of FIG. 6A.
Figure 6C:
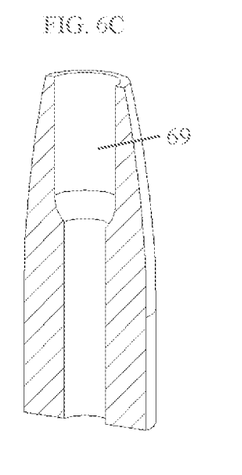
FIG. 6C is a simplified sectional illustration of the bamboo pole that has been prepared for the connector of FIG. 6A, in accordance with a non-limiting embodiment of the present invention.

Reference is now made to FIGS. 6A-6C, which illustrate an external connector 60 for a bamboo pole, inserted in the pole, in accordance with a non-limiting embodiment of the present invention.

Connector 60 has an internally conical and curved body 61 formed with a central longitudinal opening 62 formed in an inner shaft 63 (opening may extend into a counterbore 64). Inner shaft 63 is spaced from the conical body 61 by an annular gap 65. The upper end of body 61 is thus formed with a circumferential skirt that fits over the end of the bamboo pole. Inner shaft 63 fits into a cutout 69 of the bamboo pole.

Figures 6D, 6E:
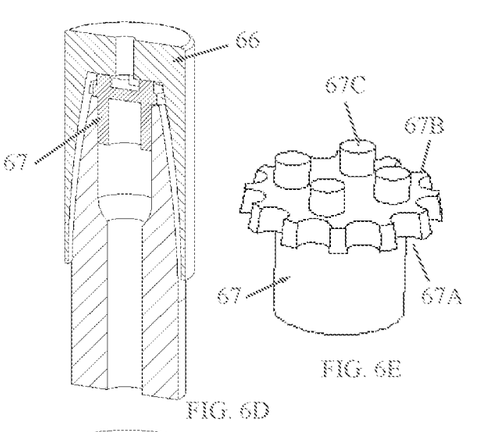
FIG. 6D is a simplified sectional illustration of an external connector for a bamboo pole, mounted on a curved surface formed on the pole, in accordance with a non-limiting embodiment of the present invention.
FIG. 6E is a simplified pictorial illustration of an adhesive flow guide element for the external connector of FIG. 6D.
Figure 6F:
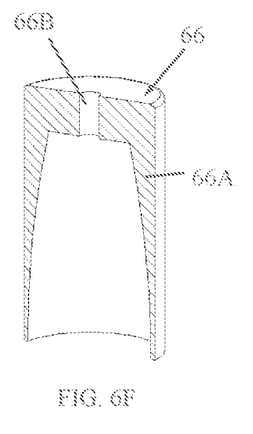
FIG. 6F is a simplified sectional illustration of the external connector of FIG. 6D.

Reference is now made to FIGS. 6D-6F, which illustrate an external connector 66 for a bamboo pole, inserted in the pole, in accordance with a non-limiting embodiment of the present invention. Connector 66 has an internally conical body 66A formed with a central longitudinal opening 66B. An adhesive flow guide element 67 (FIG. 6E) is formed with gaps 67A and lugs 67B and fits into the cutout 69 (FIG. 6C) of the bamboo pole, and helps guide the flow of adhesive for uniform coverage. The adhesive flow guide element 67 may have bumps 67C for spacing the element 67 from connector 66.

Figure 6G:
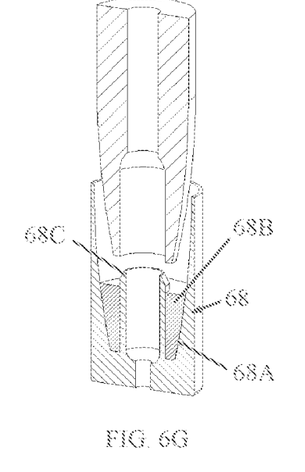
FIG. 6G is a simplified sectional illustration of an external connector for a bamboo pole, mounted on a curved surface formed on the pole, in accordance with a non-limiting embodiment of the present invention, the connector having a trough for placing adhesive therein.

Reference is now made to FIG. 6G, which illustrates an external connector 68 for a bamboo pole, mounted on a curved surface formed on the pole, in accordance with a non-limiting embodiment of the present invention. Connector 68 has a trough 68A for placing adhesive 68B therein, before inserting the bamboo pole. The trough 68A is annular and is formed in the gap between the inner wall of connector 68 and an inner shaft 68C.

Figure 7A:
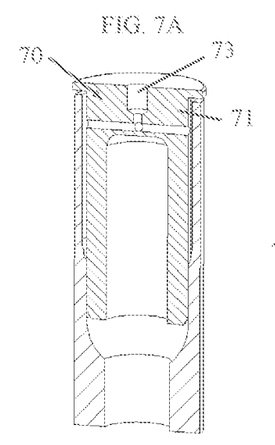
FIG. 7A is a simplified sectional illustration of a straight connector for a bamboo pole, inserted in the pole, in accordance with a non-limiting embodiment of the present invention, with a transverse adhesive passageway.
Figure 7B:
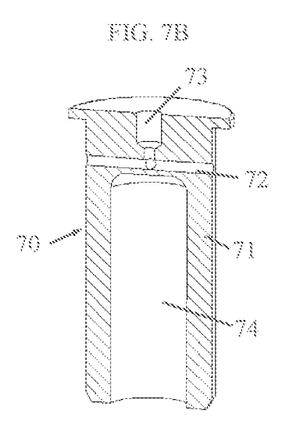
FIG. 7B is a simplified sectional illustration of the connector of FIG. 7A.
Figure 7C:
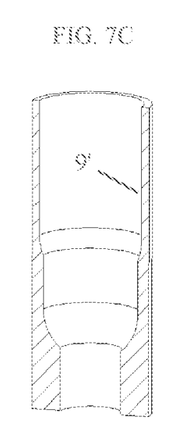
FIG. 7C is a simplified sectional illustration of the bamboo pole that has been prepared for the connector of FIG. 7A, in accordance with a non-limiting embodiment of the present invention.

Reference is now made to FIGS. 7A-7C, which illustrate an end connector 70 for a bamboo pole, in accordance with a non-limiting embodiment of the present invention.

The connector 70 includes a straight cylindrical body 71 formed with a transverse aperture 72 which communicates with a longitudinal opening 73. Body 71 may be formed with a counterbore 74 to reduce weight. After inserting end connector 70 into an open end of a bamboo pole 9', adhesive may be introduced into longitudinal opening 73 and the adhesive flows to transverse aperture 72, from there flowing into, and uniformly coating, the gap between the outer contour of body 71 and the inner contour of the bamboo pole 9', thereby achieving an excellent fixation of end connector 70 into the bamboo pole 9'.

The connector of FIGS. 7A-9B may be configured to be internal or external to the bamboo pole.

Figure 8A:
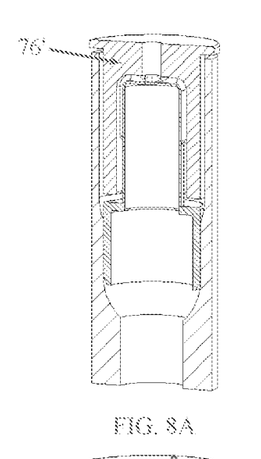
FIG. 8A is a simplified sectional illustration of a straight connector for a bamboo pole, inserted in the pole, in accordance with a non-limiting embodiment of the present invention, with mating parts.
Figure 8B:
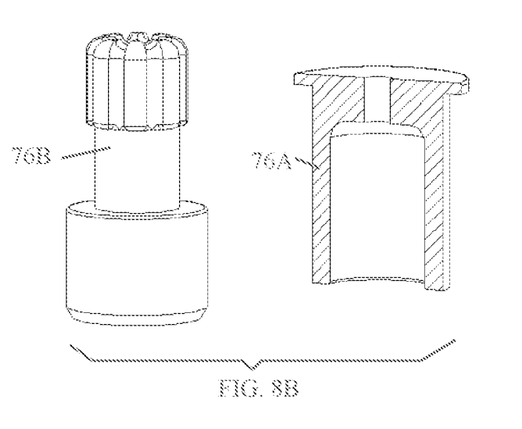
FIG. 8B is a simplified sectional illustration of the mating parts connector of FIG. 8A.

In FIGS. 8A-8B, connector 76' (similar to connector 76 of FIG. 9A) is made of two or more parts, such as a first part 76A and a second part 76B, as similarly described for the embodiment of FIGS. 2A-2C.

Figure 9A:
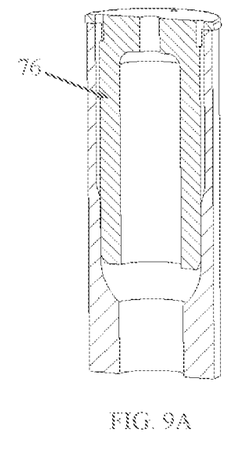
FIG. 9A is a simplified sectional illustration of a straight connector for a bamboo pole, inserted in the pole, in accordance with a non-limiting embodiment of the present invention, with one or more parallel adhesive passageways.
Figure 9B:
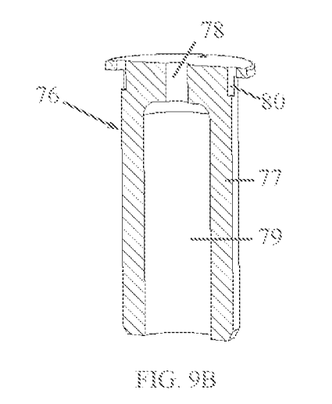
FIG. 9B is a simplified sectional illustration of the connector of FIG. 9A.

Reference is now made to FIGS. 9A-9B, which illustrate another connector 76 for a bamboo pole, in accordance with another non-limiting embodiment of the present invention.

The connector 76 includes a cylindrical body 77 formed with a central longitudinal opening 78 that opens into a counterbore 79 (used, for example, to reduce weight). Additional longitudinal openings 80 (two or more) may be formed offset to central longitudinal opening 78, preferably, but not necessarily, symmetric with central longitudinal opening 78. After inserting end connector 76 into an open end of a bamboo pole, adhesive may be introduced into longitudinal openings 80 and the adhesive flows to, and uniformly coats, the gap between the outer contour of body 77 and the inner contour 9' of the bamboo pole, thereby achieving an excellent fixation of end connector 76 into the bamboo pole.

Figure 10A:
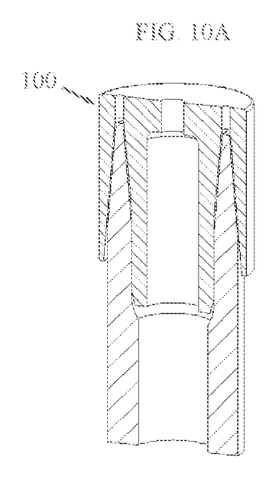
FIG. 10A is a simplified sectional illustration of an external-internal connector for a bamboo pole, inserted in the pole, in accordance with a non-limiting embodiment of the present invention.
Figures 10B, 10C:
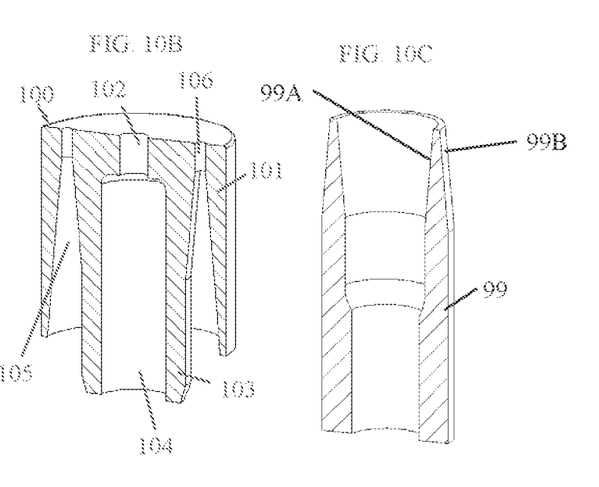
FIG. 10B is a simplified sectional illustration of the connector of FIG. 10A.
FIG. 10C is a simplified sectional illustration of the bamboo pole that has been prepared for the connector of FIG. 10A, in accordance with a non-limiting embodiment of the present invention.

Reference is now made to FIGS. 10A-10C, which illustrate an external connector 100 for a bamboo pole, inserted in the pole, in accordance with a non-limiting embodiment of the present invention.

Connector 100 has a partially conical (both inner and outer conical shapes), partially cylindrical (cylindrical at the inner lower portion) body 101 formed with a central longitudinal opening 102 formed in an inner shaft 103 (opening may extend into a counterbore 104). Inner shaft 103 is spaced from the conical body 101 by an annular gap 105. Additional longitudinal openings 106 (two or more), for intruding therein adhesive, may be formed offset to central longitudinal opening 102, preferably, but not necessarily, symmetric with central longitudinal opening 102. The upper end of body 101 is thus formed with a circumferential skirt that fits over the end of the bamboo pole 99. Pole 99 has inner and outer surfaces 99A and 99B formed to receive connector 100. In this embodiment, the body 101 is conical both inside and outside; in the embodiment of FIGS. 3A-3C the body 31 is conical on the outside.

Figure 11A:
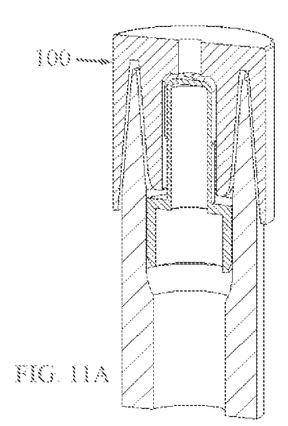
FIG. 11A is a simplified sectional illustration of an external-internal connector for a bamboo pole, inserted in the pole, in accordance with a non-limiting embodiment of the present invention, with mating parts.
Figure 11B:
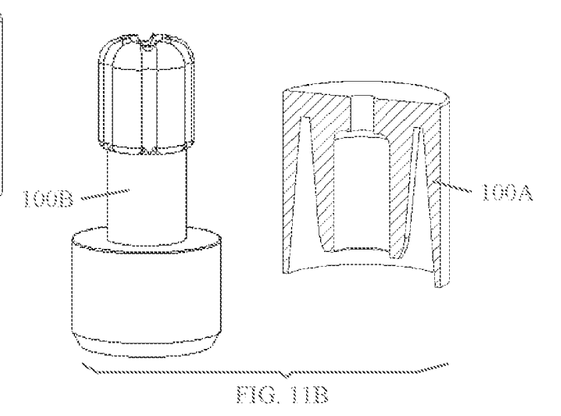
FIG. 11B is a simplified sectional illustration of the mating parts connector of FIG. 11A.

FIGS. 11A-11B illustrate another version of connector 100 made of mating parts 100A and 100B, which mate with male and female connections.

Figure 12A:
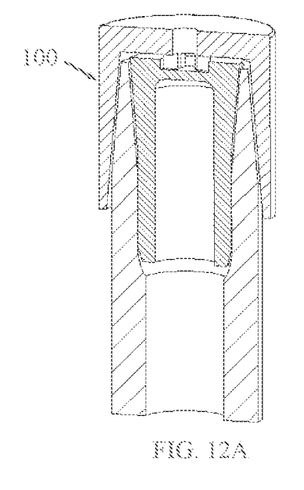
FIG. 12A is a simplified sectional illustration of an external-internal connector for a bamboo pole, inserted in the pole, in accordance with a non-limiting embodiment of the present invention, with mating parts.
Figure 12B:
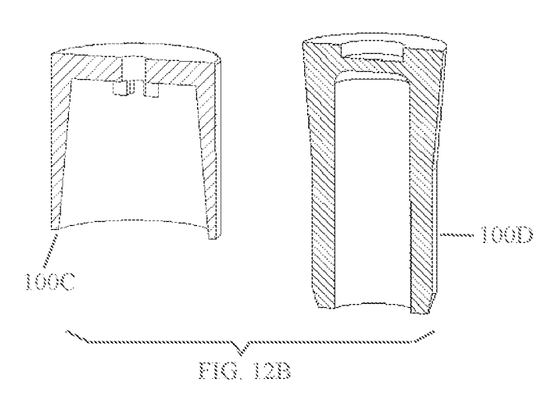
FIG. 12B is a simplified sectional illustration of the mating parts connector of FIG. 12A.

FIGS. 12A-12B illustrate another version of connector 100 made of mating parts 100C and 100D, which mate with male and female connections.

Figure 13A:
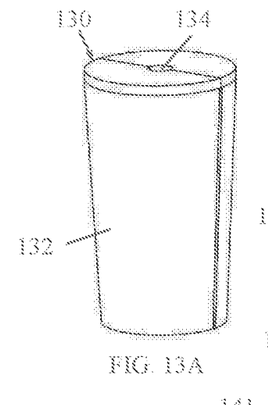
FIGS. 13A and 13B are simplified perspective and cutaway illustrations, respectively, of a connector for a bamboo pole, in accordance with a non-limiting embodiment of the present invention.
Figure 13B:
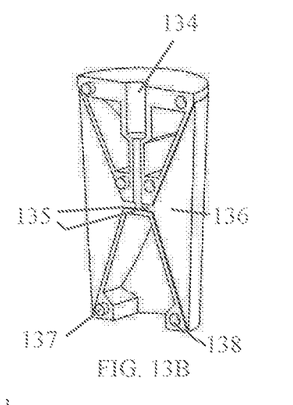

Reference is now made to FIGS. 13A and 13B, which illustrate a connector 130 for a bamboo pole, in accordance with another non-limiting embodiment of the present invention.

The connector 130 includes a conical body 132 formed with a central longitudinal opening 134 (with or without a uniform diameter) that opens into two diametrically-opposed transverse passageways 135, each of which in turn widens into a diverging opening 136 that widens towards the sides of conical body 132. After inserting end connector 130 into an open end of a bamboo pole (whether the bamboo pole was specially prepared or not), adhesive may be introduced into longitudinal opening 134 and the adhesive flows to transverse passageways 135 and diverging openings 136, and from there uniformly coats, the gap between the outer contour of conical body 132 and the inner contour of the bamboo pole, thereby achieving an excellent fixation of end connector 130 into the bamboo pole. Here again, the connector may be rotated after insertion into the bamboo pole, to help smear the adhesive around the perimeter of the connector.

Optionally, connector 130 may be constructed of two halves that fit together by means of mating parts 137 and 138 (such as tenons and holes).

Figure 14A:
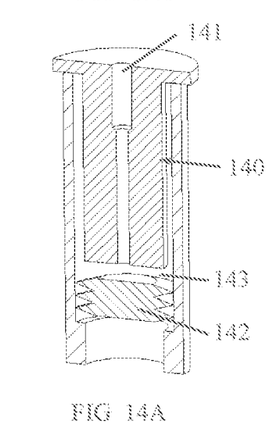
FIG. 14A is a simplified sectional illustration of a connector for a bamboo pole, inserted in the pole, in accordance with a non-limiting embodiment of the present invention, having a seal.

Reference is now made to FIG. 14A, which illustrates a connector 140 for a bamboo pole, in accordance with another non-limiting embodiment of the present invention. Connector 140, which may or may not have a conical body, is formed with a central longitudinal opening 141 (with or without a uniform diameter). A seal 142 may be placed below connector 140, separated therefrom by a gap 143. After inserting end connector 140 into an open end of a bamboo pole, adhesive may be introduced into longitudinal opening 141 and the adhesive fills the space above seal 142 and flows to uniformly coat a circumferential gap between the outer contour of connector 140 and the inner contour of the bamboo pole, thereby achieving an excellent fixation of end connector 140 into the bamboo pole.

Figure 14B:
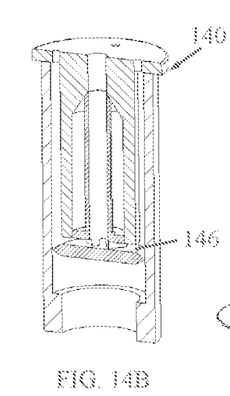
FIGS. 14B and 14C are simplified front-view and pictorial illustrations, respectively, of a connector for a bamboo pole, in accordance with a non-limiting embodiment of the present invention, having a seal which is shown in FIG. 14C.
Figure 14C:
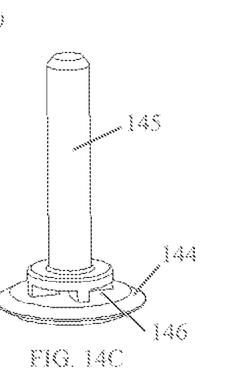

FIGS. 14B and 14C illustrate another version of connector 140, which includes a seal 144 at an end of a rod 145 that is disposed in connector 140. Rod 145 serves as a flow guide for the adhesive; the adhesive flows through the hollow rod 145 and out passageways 146 formed in the bottom of rod 145 (before seal 144) and then flows to the gap between connector 140 and the inside contour of the pole.

Figure 15A:
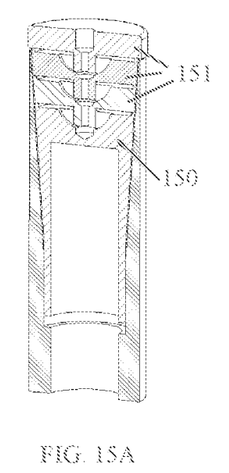
FIGS. 15A and 15B are simplified cutaway illustrations of a set of connectors, in accordance with a non-limiting embodiment of the present invention.
Figure 15B:
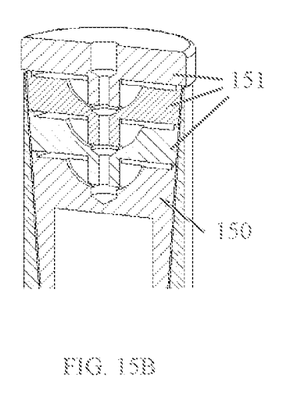
Figures 16A, 16B, 16C, 16D:
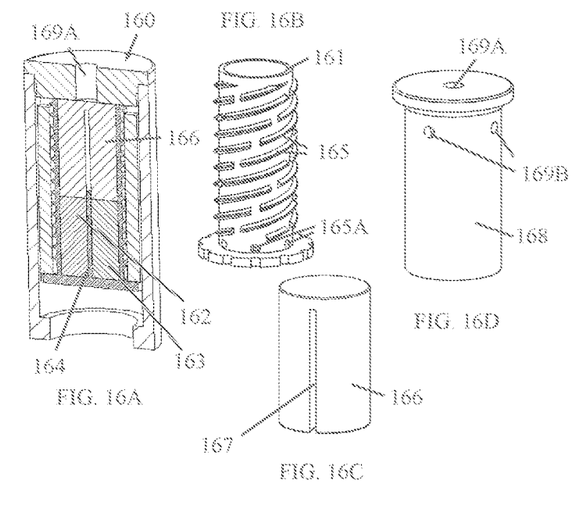
FIGS. 16A-16D are simplified cutaway (FIG. 16A) and perspective (FIGS. 16B-16D) illustrations, respectively, of a connector for a bamboo pole, in accordance with a non-limiting embodiment of the present invention.

Reference is now made to FIGS. 15A and 15B, which illustrate a connector 150 plus an additional set of connectors 151 that are nested or stacked one in the other above connector 150 (in the sense of the drawing), in accordance with a non-limiting embodiment of the present invention. Connector 150 may be made in accordance with any of the connectors described herein. The additional connectors 151 fill in the space to the end of the pole so that the last connector 151 is flush with the end of the pole or protrudes beyond the end of the pole. The adhesive flows from one additional connector 151 to another to bond the connectors to each other, and of course the adhesive bonds all the connectors to the bamboo pole as before.

Reference is now made to FIGS. 16A-16D, which illustrate a connector 160 for a bamboo pole, in accordance with a non-limiting embodiment of the present invention. Connector 160 may include an adhesive reservoir 161 (FIG. 16B), which has two or more internal compartments 162 and 163 (seen in FIG. 16A) for two or more different parts of an adhesive (such as two part or multi-part epoxy) separated by one or more partitions 164. Alternatively, the adhesive could be one part and the partition seals the adhesive from air;

breaking the partition brings the adhesive into contact with air. The outer contour of adhesive reservoir 161 may be formed with external protrusions 165 (continuous or not continuous), which serve as a mixer for mixing the two parts of the adhesive, similar to a mixing nozzle. The adhesive reservoir 161 may be formed with openings 165A for the adhesive to flow out of. A piston 166 (FIG. 16C) fits into the inner chamber of adhesive reservoir 161 and is formed with a notch 167 so that when piston 166 presses down on the materials in the internal compartments 162 and 163, the notch 167 moves down over partition 164. Connector 160 also includes an outer member 168 (FIG. 16D), which is formed with a longitudinal opening 169A and with one or more transverse openings 169B. The adhesive reservoir 161 and piston 166 fit into the hollow interior of outer member 168. A screw or other mechanical device or tool may be used to push piston 166 down (in the sense of the figures) to cause the two part adhesive to flow out of internal compartments 162 and 163 via the openings 165A. The two parts mix together and flow over or between protrusions 165 and eventually through openings 169B to the gap between the outer contour of connector 160 and the inner contour of the bamboo pole. Alternatively, there is no partition and adhesive may be introduced in closed bags which are ruptured and opened by the piston so that the adhesive components mix together.

Figure 17A:
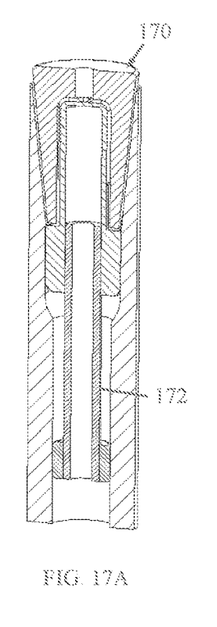
FIGS. 17A and 17B are simplified sectional and perspective illustrations, respectively, of a connector for a bamboo pole, inserted in the pole, in accordance with a non-limiting embodiment of the present invention, having increased resistance to being pulled out of the bamboo pole by a torque applied to the connector.
Figure 17B:
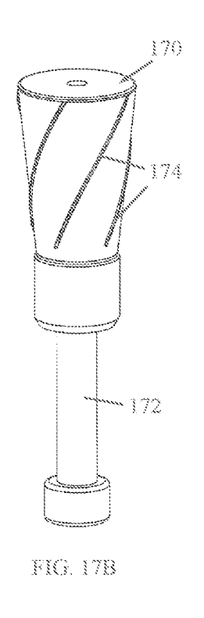

Reference is now made to FIGS. 17A-17B, which illustrate a stud 172 coupled to a connector 170 (connector 170 may be made in accordance with any of the connectors described herein). Stud 172 goes further into the bamboo pole and increases the resistance of the connector 170 to being pulled out of the pole by a torque applied to the connector 170; stud 172 abuts against the inner wall of the pole when torque is applied to the connector 170. Stud 172 extends into the longitudinal bore of connector 170, thereby increasing the length of the lever arm that works against torque pull-out. Connector 170 may have protrusions 174, which may be helical or straight or other shapes, which ensure that there is a gap between the outer contour of the connector and the inner contour of the bamboo pole so that there will always be room for the adhesive to flow and bond the connector to the pole. The protrusions may be implemented in any of the connectors described herein.

Figure 18A:
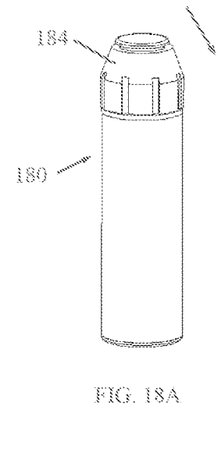
FIGS. 18A and 18B are simplified perspective and cutaway illustrations, respectively, of a telescopic connector for a bamboo pole, in accordance with a non-limiting embodiment of the present invention.
Figures 18B, 18C:
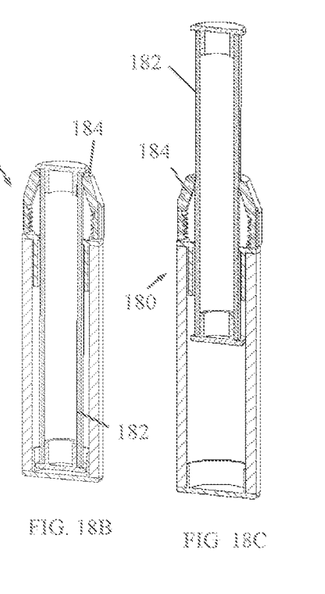
FIG. 18C is a simplified sectional illustration of the telescopic connector in an extended position.

Reference is now made to FIGS. 18A-18C, which illustrate a telescopic connector 180 for a bamboo pole, in accordance with a non-limiting embodiment of the present invention. The telescopic connector 180 may be built according to any of the embodiments of the invention with an addition: a telescoping member 182 that can be extended to any desired position. The telescoping member 182 acts as an extendable (variable-length) arm. Connector 180 may include a collet head 184 which is threadingly engaged on the connector body. The collet head 184 may be loosened to move the telescoping member 182 to a desired length and then tightened to lock the telescoping member 182 in place.

Reference is now made to FIGS. 19A-19G, which illustrate a connector 190, in accordance with another non-limiting embodiment of the present invention.

Figures 19A, 19B, 19C, 19D, 19E, 19F, 19G, 20A, 20B, 21A, 21B, 21C:
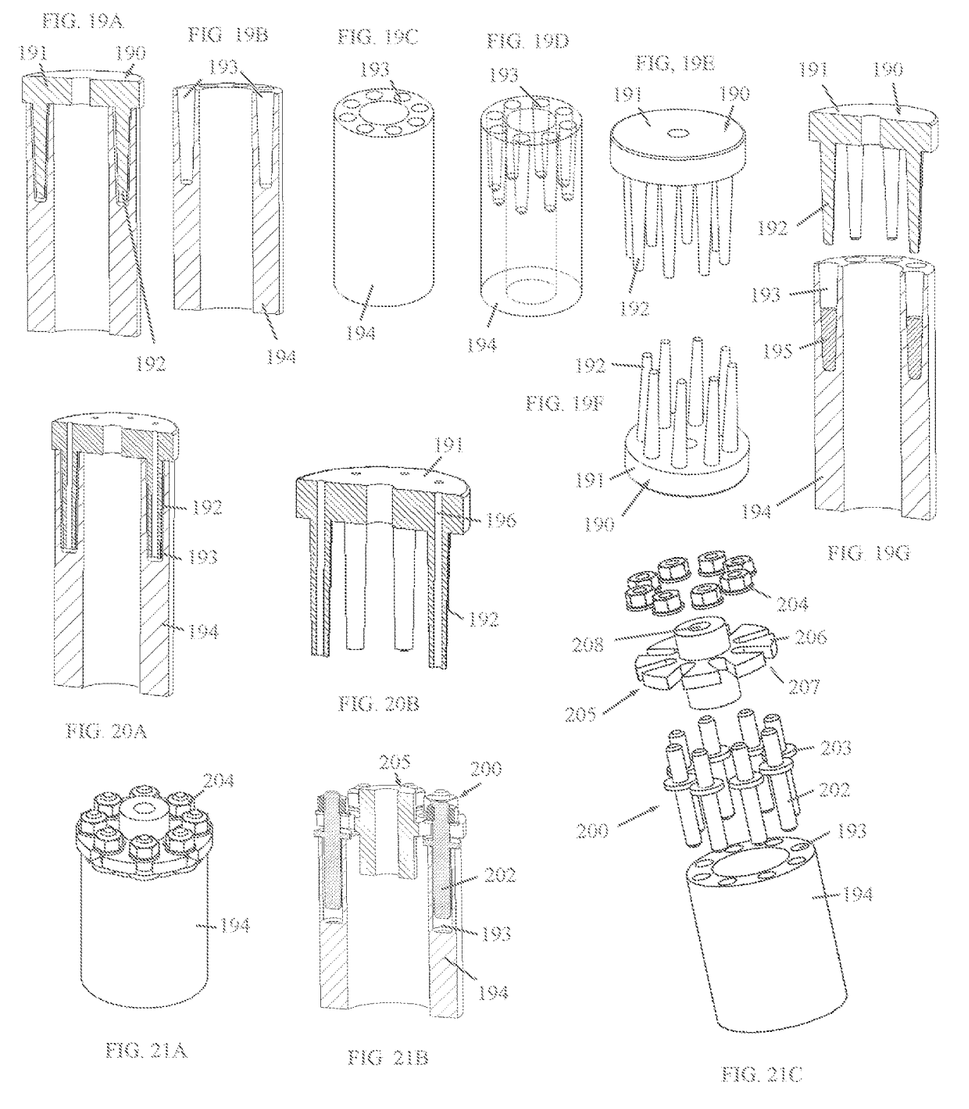
FIGS. 19A and 19B are simplified cutaway illustrations of a connector inserted into apertures formed in a bamboo pole and of the pole itself, respectively, in accordance with a non-limiting embodiment of the present invention.
FIGS. 19C and 19D are simplified perspective and transparent view illustrations, respectively, of the pole itself with the apertures.
FIGS. 19E and 19F are simplified perspective illustrations of the connector.
FIG. 19G is a simplified sectional illustration of inserting the connector into apertures that have adhesive placed therein.
FIGS. 20A and 20B are simplified sectional illustrations of a connector inserted into apertures formed in a bamboo pole and of the connector itself, respectively, in accordance with a non-limiting embodiment of the present invention.
FIGS. 21A, 21B and 21C are simplified perspective, cutaway and exploded illustrations, respectively, of another connector that includes a plurality of posts, in accordance with another non-limiting embodiment of the present invention.

Connector 190 includes a cap portion 191 from which extend a plurality of posts 192 which may be inserted in apertures 193 formed in the wall thickness of a bamboo pole 194 (FIGS. 19B-19D). In FIG. 19G, some of the apertures 193 have been pre-filled (at least partially) with an adhesive 195 to bond the posts 192 to the pole 194.

Reference is now made to FIGS. 20A and 20B, which illustrate another version of connector 190 inserted into apertures 193 formed in bamboo pole 194. In this version, connector 190 is formed with one or more longitudinal passageways 196 for introducing adhesive, as described for other embodiments. As with all other embodiments, this embodiment may be made of more than one part, such as two parts that fit into each other.

Reference is now made to FIGS. 21A-21C show another connector 200, which does not have a cap portion but rather a plurality of posts 202 which may be inserted in apertures 193 formed in the wall thickness of bamboo pole 194. Each post 202 may have a skirt 203, which serves as a washer or base after insertion into the pole. The upper portion of post 202 may be threaded to accept nuts 204 or other fasteners. A spacer element 205 may be used to space the posts 202 from each other. Spacer element 205 may have a plurality of protrusions 206 with gaps 207 through which the posts 202 are received. Spacer element 205 may be formed with an interface member 208 for external connections, such as a longitudinal bore, threaded hole, post, etc.

Reference is now made to FIGS. 22A-22D, which illustrate connectors for connecting to a side surface of a bamboo pole, in accordance with other non-limiting embodiments of the present invention.

Figure 22A:
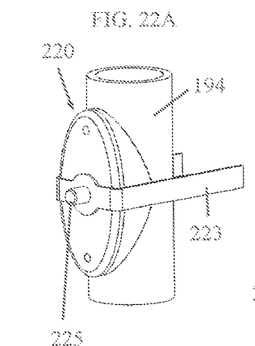
Figure 22B:
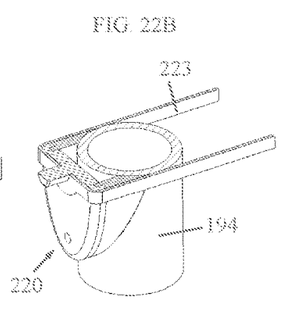
Figure 22C:
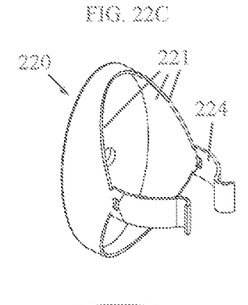
Figure 22D:
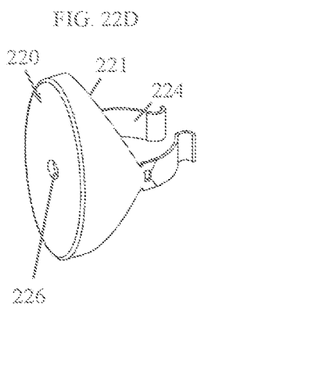

In FIG. 22A, a connector 220 has attachment surfaces 221 formed as a negative of the cylindrical outer contour of the bamboo pole 194 (attachments surfaces 221 may be concave). The attachments surfaces 221 may be made of a flexible material, such as rubber, as opposed to the rest of the connector which may be more rigid. The flexibility allows the attachments surfaces 221 to match a wide range of pole sizes and to achieve good sealing for inserting adhesive (via apertures in the connector as described above). This applies to other embodiments of the invention. Connector 220 may be attached to the pole with adhesive or with straps 223 (FIGS. 22A-22B) or with clips 224 (FIGS. 22C-22D). When used with adhesive, the straps or clips may be discarded after bonding. Connector 220 may include a stud 225 (which may be threaded; FIG. 22A) to which other elements may be attached or a mounting hole 226 (FIG. 22D), which may be threaded.

Figure 23A:
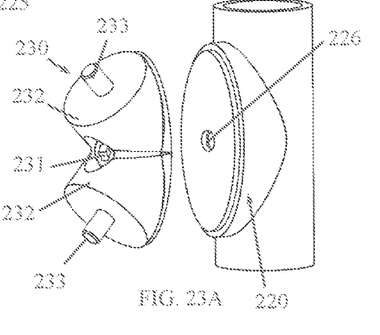

Reference is now made to FIG. 23A, which illustrates an additional connector 230 that can be secured to connector 220, such as by means of a fastener 231 (e.g., screw) that screws into mounting hole 226 of connector 220. Additional connector 230 may include interface attachment members 232, which may include upper and lower attachment studs 233 (which may be threaded) to which other elements may be attached.

Figure 23B:
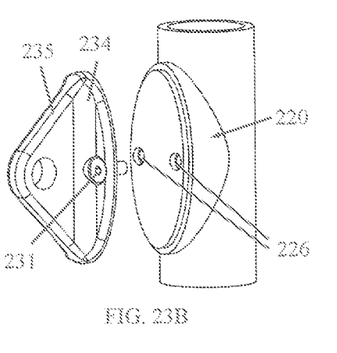

In FIG. 23B, an interface attachment member 234 may include a flange 235 to which other elements may be attached. Interface attachment member 234 may be secured to connector 220, such as by means of fasteners 231 that screw into mounting holes 226 of connector 220. Flange 235 may protrude perpendicular from the body of interface attachment member 234.

Figure 23C:
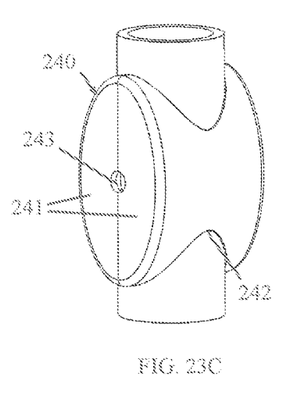

In FIG. 23C, a connector 240 may be formed of two body halves 241, each of which has an attachment surface 242 formed as a negative of the cylindrical outer contour of the bamboo pole. The two halves 241 may be pressed and attached to the pole with adhesive. Connector 240 may include an opening 243 (which may be threaded) to which other elements may be attached.

Figure 23D:
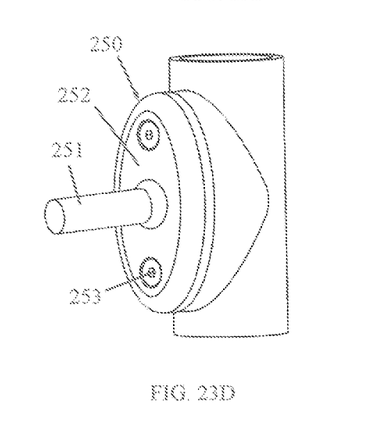

In FIG. 23D, a connector body 250 is attached to the side of the bamboo pole, as previously described. A mounting member 251 is pivotally mounted in connector body 250. Mounting member 251 may include a stud or rod or other mounting structure coupled to a base member 252 that is pivotally mounted in connector body 250. This permits the mounting member 251 to be tilted at any desired angle. In this manner, mounting member 251 may be used to compensate for misalignments and tolerance mismatches. One or more fasteners 253 may be used to fix base member 252 at a desired tilt angle. The mounting member 251 may be locked in place with the adhesive or with the fasteners 253. Before locking in place, mounting member 251 may be rotated or otherwise moved. For example, one can grasp mounting member 251 from the outside and move it before locking. As another example, mounting member 251 may have a screw head (e.g., Allen head) that can be accessed from inside base member 252 with an appropriate tool to rotate or otherwise move mounting member 251. The same principle may be used for other mounting members such as members 233.

Figure 23E:
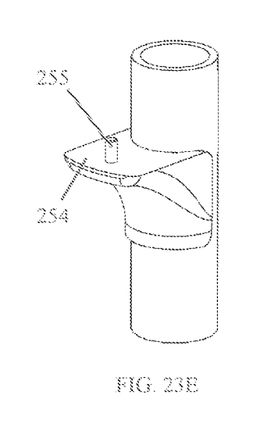

In FIG. 23E, a connector 254 may be attached to the pole like connector 220 of FIG. 22A, except that the body of connector 254 is shaped like a shelf. Connector 254 may include an interface attachment member 255, such as an upright stud (which may be threaded) to which other elements may be attached.

Reference is now made to FIGS. 24A-26B, which illustrate pole connector systems (also referred to as pole joint connectors) for connecting one pole to another. The bamboo poles may be in parallel connection or non-parallel connection (such as curved or tilted with respect to one another). This can be used to create a pole of superior strength, a multi-pole with increased moment of inertia.

In FIGS. 24A-26B, a connector plate 1130 is provided with a plurality of mounting elements 1131, for example, either male or female fasteners that mate with the connector ends of bamboo poles 1000. For example, the mounting elements 1131 may be tapped mounting holes for threaded connection with male threaded studs. As another example, the mounting elements 1131 may be male threaded studs for mating with tapped mounting holes on the connector ends of the poles. Optionally, the mounting elements 1131 may be phase shifted so that the mounting element 1131 on one side of connector plate 1130 is circumferentially shifted with respect to the mounting element 1131 on the opposite side of connector plate 1130.

Figures 24A, 24B:
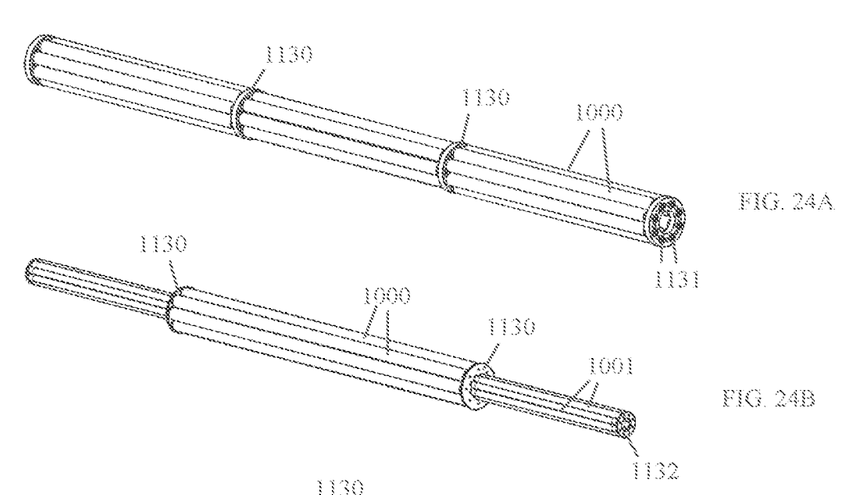
FIGS. 24A-24D are simplified perspective illustrations of connectors that create multi-pole assemblies, in accordance with non-limiting embodiments of the present invention.
Figures 24C, 24D:
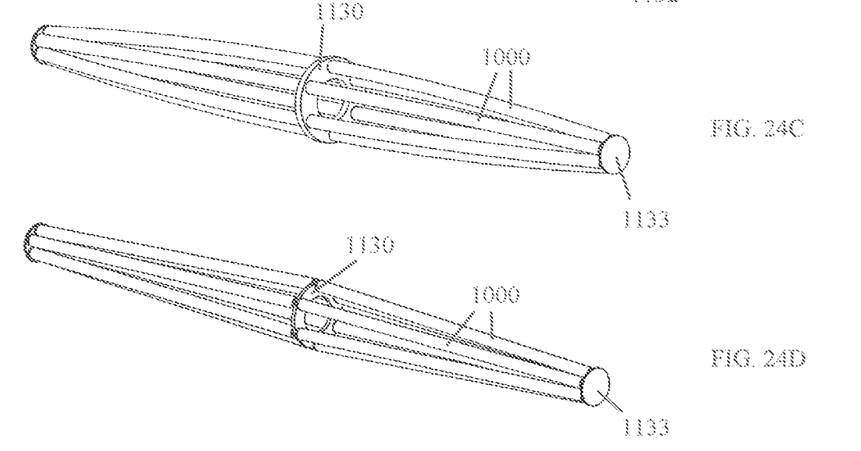

The poles may be mounted in parallel formation to connector plate 1130, as seen in FIGS. 24A and 24B. In FIG. 24B, smaller diameter poles 1001 are connected at one end to the relatively larger connector plate 1130 (at mounting elements that are inwards relative to the mounting elements on the other side of the plate) and at the opposite end to a relatively smaller connector plate 1132. Alternatively, as seen in FIG. 24C, the poles 1000 may be slanted with respect to each other to produce different connection effects. One end of each pole 1000 is connected to connector plate 1130 and the opposite end is connected to an end cap 1133. The poles 1000 pass through mounting holes in connector plate 1130 and assume a slightly bent shape. Alternatively, as seen in FIG. 24D, the poles 1000 do not pass through connector plate 1130 but instead are connected to opposing faces of connector plate 1130.

Figure 25:
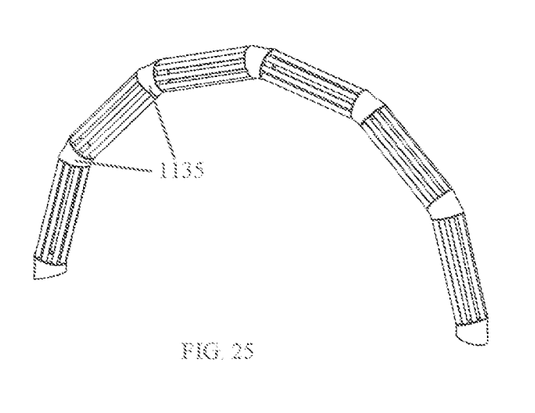
FIG. 25 is a simplified perspective illustration of connectors that create tilted, curved or polygonal multi-pole assemblies, in accordance with non-limiting embodiments of the present invention.

As seen in FIG. 25, a connector plate 1135 with slanted sides may be used. In this manner, the poles can be tilted with respect to each other to form an arcuate or polygonal structure.

Figure 26A:
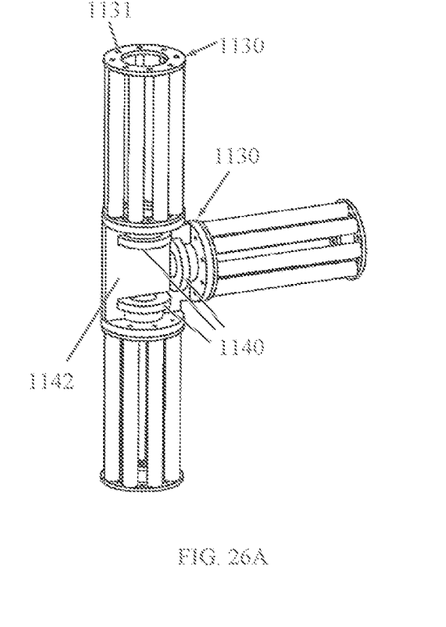
FIGS. 26A-26B are simplified perspective illustrations of connectors that create multi-pole assemblies perpendicular to each other, in accordance with non-limiting embodiments of the present invention.

In FIG. 26A, three multi-pole assemblies are connected to each other by means of fasteners, such as a round tenon 1140 extending from each connector plate 1130 that is received in grooves formed in a coupling element 1142 placed at the junction of the three multi-pole assemblies. In this manner, the three multi-pole assemblies are perpendicular to each other.

Figure 26B:
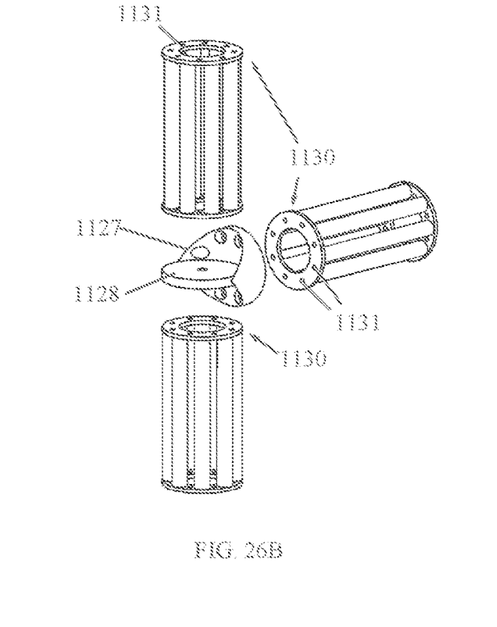

In FIG. 26B, three multi-pole assemblies are connected to each other by means of a fastener that includes a hub 1127 and a mounting plate 1128 that protrudes from hub 1127 (such as perpendicular protrusion). Hub 1127 is fastened to the mounting elements 1131 of the connector plate 1130 of one of the multi-pole assemblies, and mounting plate 1128 is fastened to the connector plates 1130 of the other multi-pole assemblies. In this manner, the three multi-pole assemblies are perpendicular to each other.

What is claimed is:

1. A method comprising:
bonding a connector to a bamboo pole, said connector formed with an internal passageway that comprises a transverse aperture which is transverse to a longitudinal axis of said connector, the longitudinal axis of said connector being defined in a direction of a longitudinal axis of said bamboo pole, wherein said transverse aperture opens radially through a side wall of said connector to an outer surface of said connector, by inserting said connector into an open end of said bamboo pole and causing an adhesive to flow via a longitudinal opening, which is along or parallel to said longitudinal axis of said connector, into said internal passageway and then flow to said outer surface of said connector such that said adhesive coats a gap between said outer surface of said connector and an inner contour of said bamboo pole and bonds said connector to said bamboo pole, and further comprising coupling an external fastener or an external mounting element to said internal passageway of said connector and to another item.

2. The method according to claim 1, wherein said connector is rotatable about its longitudinal axis after insertion into said bamboo pole to smear said adhesive around said outer surface of said connector.

3. The method according to claim 1, wherein said transverse aperture is perpendicular to said longitudinal opening.

4. The method according to claim 3, wherein said longitudinal opening comprises a central longitudinal opening, and said transverse aperture widens into a diverging opening that widens towards a side of said body.

5. The method according to claim 1, further comprising a seal for sealing flow of said adhesive.

* * * * *